O. S. HASLETT.
SPEED INDICATOR AND SIGNAL.
APPLICATION FILED FEB. 8, 1921.
1,420,314.
Patented June 20, 1922.
2 SHEETS—SHEET 1.
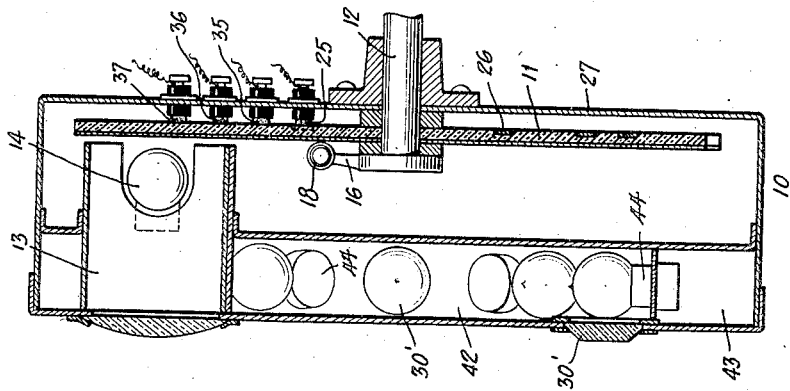
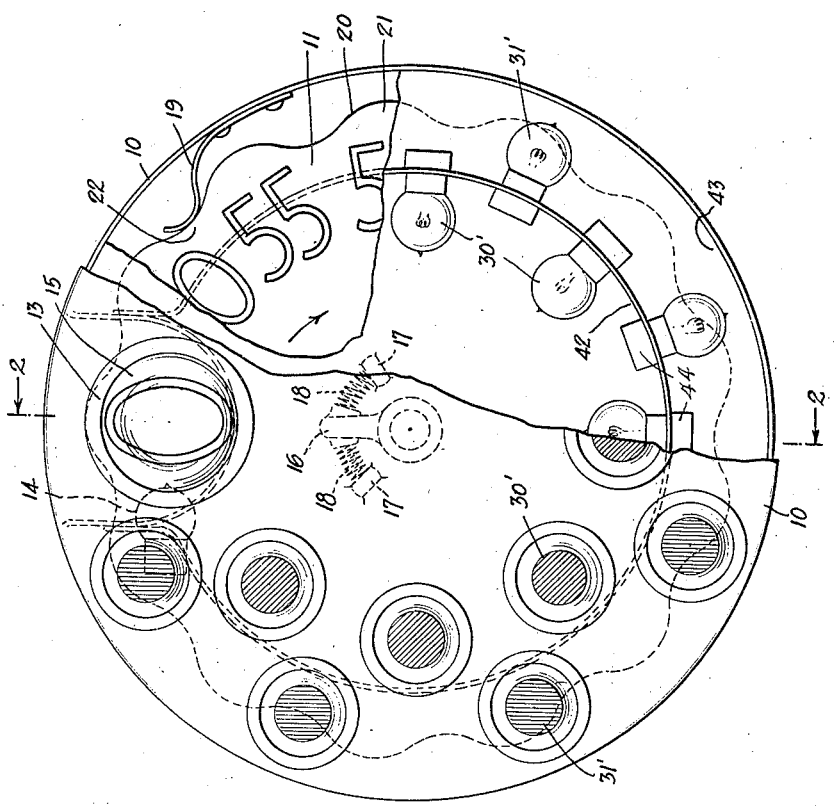
INVENTOR
O. S. Haslett
BY
Geo. L. Beeler
ATTORNEY O. S. HASLETT.
SPEED INDICATOR AND SIGNAL.
APPLICATION FILED FEB. 8, 1921.
1,420,314.
Patented June 20, 1922.
2 SHEETS—SHEET 2.
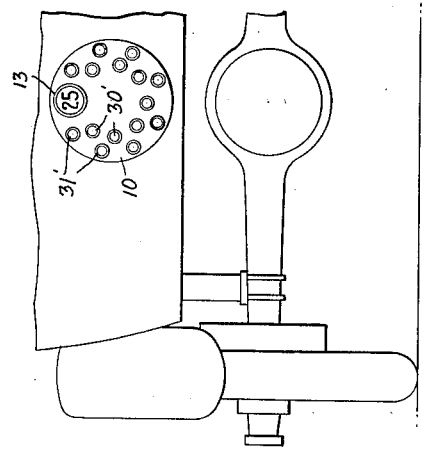
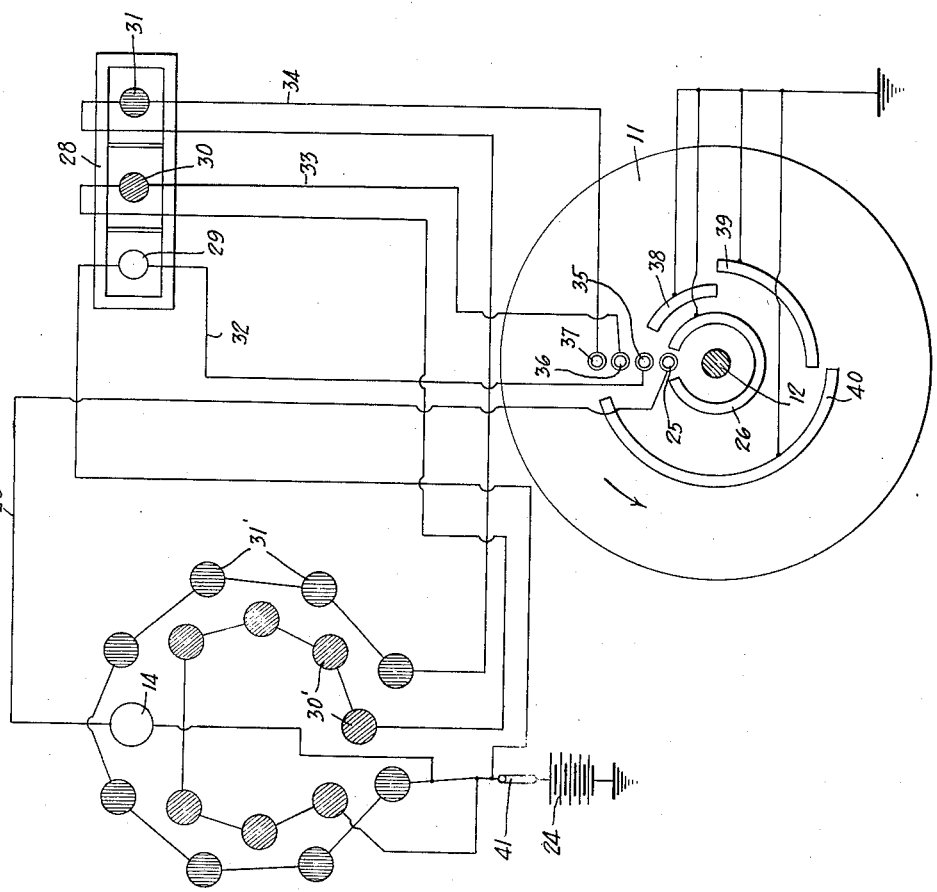

UNITED STATES PATENT OFFICE.

OSCAR S. HASLETT, OF JERSEY CITY, NEW JERSEY.

SPEED INDICATOR AND SIGNAL.

1,420,314.   Specification of Letters Patent.   Patented June 20, 1922.

Application filed February 8, 1921. Serial No. 443,426.

*To all whom it may concern:*

Be it known that I, OSCAR S. HASLETT, a citizen of the United States, residing at Jersey City, in the county of Hudson and State of New Jersey, have invented certain new and useful Improvements in Speed Indicators and Signals, of which the following is a specification.

This invention relates to accessories for automobiles or other analogous vehicles, and has particular reference to devices relating to the speed of such vehicles.

Among the objects of the invention is to provide indicating means, designed primarily to disclose to any member of the public or to a traffic officer the approximate rate of speed at which the vehicle is being operated.

Another and more specific object is to provide an indicator of such a nature that not only will the rate of speed be indicated numerically, but also, by color manifestations anyone can note at a glance whether the machine is being operated within a safety rate of speed or at a rate of speed in excess thereof.

A still further object of the invention is to provide a dash board attachment with a plurality of lamps located therein in easy view of the driver of the vehicle, said lamps being severally in circuit with distinctive lamps or sets of lamps in the main indicator casing, which latter may be located either at the rear of the machine, at the front thereof, or if desired at both the rear and the front, so as to be visible both in front of and at the rear of the moving vehicle, or it may be located at any other desired place without affecting the mode of operation or advantages of the structure.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a face view of the indicator casing, parts being broken away.

Fig. 2 is a vertical section on the line 2—2 of Fig. 1.

Fig. 3 is a diagram indicating a suggested location of my indicator on the rear end of the vehicle.

Fig. 4 is a diagram of the wiring and related parts, the view of the contact disk being understood to be the reverse from the view thereof in Fig. 1, arrows on these figures indicating the direction of movement of this disk as it speeds up from 0.

Referring now more specifically to the drawings I show the main indicator and signal as comprising a casing 10 of any suitable design, size, or construction, but represented as of flat cylindrical form, serving to house a disk 11 of any suitable material but in the nature of insulation, the same being mounted concentrically upon a speedometer shaft 12 or its equivalent, the angular rotation or position of which shaft is dependent upon the speed of the vehicle in accordance with the operation of any well known or approved speedometer and with which I am not otherwise particularly concerned in this description. One face, which may be regarded as the front face of the disk carries a series of numerical indications, represented herein as from 0 to 60 in steps of 5. These numbers are arranged in a circle concentric with the axis of the shaft 12 and are adapted to be brought in succession into view at a display chamber 13 within which the light from a lamp 14 is projected for brilliant illumination, said chamber being provided at its front end with a large magnifying lens 15 whereby any numerical value in view at the rear end of the chamber is rendered plainly visible at a long distance, it being noted that the peripheral portion of the disk sweeps close at the rear of said chamber 13.

It being well understood that there is a more or less constant floating or irregular movement of the speedometer shaft due to fluctuations in the speed developed by the machine, and mindful of the desirability for the numerical indications on the disk to be brought or held in succession centrally of the display chamber, I provide means whereby the disk may partake of a step by step movement even though the shaft 12 may vibrate or fluctuate freely independently thereof within certain reasonable limits. To this end I connect rigidly to the shaft 12 an actuating member 16, shown in the nature of a finger extending radially from the inner end of the shaft within the casing and close in front of the disk. On opposite sides of this actuator 16 are fixed to the disk two lugs 17 both spaced normally equally from the actuator. In these spaces are provided cushions in the nature of coil springs 18 having constant bearing between the lugs at one end and the free end of the actuator at the other end. Hence within the scope of the flexibility or force of these springs the shaft and the actuator are adapted for movement independently of the disk. Any suitable means may be provided for co-operation with the disk to hold it temporarily from movement or control its rotation. This means is shown in the nature of a spring shoe 19 fixed to the interior of the casing and having resilient contact with any irregular portion of the disk, shown as a sinuous periphery 20 thereof. This periphery or edge consists therefore of a continued succession of crests 21 and valleys 22, the valleys being effective in co-operation with the shoe while the numerical indications are in proper registry with the axis of the display chamber 13. In other words, while I have indicated herein the provision of thirteen steps from 0 to 60 inclusive, there are likewise provided thirteen valleys 22. It follows that since the disk will be held momentarily stationary by co-operation between the shoe and a valley, even though the actuator may be vibrating somewhat, the number on the disk approximating the speed of the machine will be held steadily in plain view through the lens or window 15. When, however, the speed varies more than a little, or enough to register a difference of more than 5 miles in speed the strength of the shoe 19 will no longer be sufficient to resist the movement of the disk, and so the disk will be rotated through one step or interval and will again be momentarily checked or retarded while the actuator may continue to vibrate or continue movement in the same direction. The shoe it will be noted has rounded surface contact with the disk and so the disk will be free to move in either direction except as it may be retarded momentarily as above described.

In order to make a number at the rear end of the display chamber plainly visible both by day and by night I provide the lamp 14, but the effectiveness of the lamp is preferably made dependent upon at least a low degree of speed of the machine. This lamp, therefore, is located in a circuit 23 from any suitable source of energy 24, the circuit including two relatively movable contacts 25 and 26, the latter being shown as approximating a circle concentric with the speedometer shaft 12 and carried upon the rear face of the disk 11. As suggested by the diagram in Fig. 4 this circuit is not closed at the relatively movable contacts until a certain rate of speed, say 5 or 10 miles, is reached, and thereafter the circuit will be continuous until the speed drops again below such predetermined rate. The fixed contact 25 is indicated as projected through the rear wall 27 of the casing 10.

28 indicates a tell-tale located on the dash board of the vehicle or at any other desired convenient location, and within independent compartments of this tell-tale casing I arrange a plurality of lamps either of distinctive colors or visible through windows having distinctive colors represented herein as at 29, 30, and 31, and as white, green, and red, respectively. These lamps are arranged in independent circuits 32, 33, and 34, respectively, either from the same source of energy 24 as the lamp 14 or otherwise as may be deemed best. These last mentioned circuits are adapted to be closed successively according to the action or location of the disk 11, as distinguished from the action or location of the actuator 16. To accomplish this result I provide for the respective circuits 32 to 34, a like number of stationary contacts 35, 36, and 37, which for convenience may be projected through the same wall 27 of the casing and in radial alignment with the contact 25. The operation of the device, however, is not dependent upon any particular location of these fixed contacts. Co-operating respectively and successively with the fixed contacts 35 to 37 are movable contacts 38, 39, and 40, shown as in the form of arcs of circles concentric with the disk but at different radial distances from such center. These contacts 38 to 40 may be of any suitable relative length so as to sub-divide the range of the indicator into as many fields of speed and each of as wide a scope as may be desired in accordance with the speed regulations in any jurisdiction or the desire of the operator of the machine. Furthermore, these contacts are relatively adjustable as to length so that the period of effectiveness thereof may be changed as desired. For example, the arc shaped contacts may be changed in position angularly around the center of the disk upon which they are fixed, or they may be made of metal thin enough to be clipped off at either end desired. At any rate, the design is that after the disk will have turned from 0 in the direction of the arrow marked thereon far enough for the contact 38 to engage the fixed contact 35 the white light at 29 will be indicated, and this light will be continued until the speed has increased sufficiently to cause the disk to snap from the last step of the contact 38 to the beginning of action of the contact 39 as it is brought into engagement with the contact 36, when the light as indicated will be changed from white at 29 to green at 30. By way of illustration the field of green light may be regarded as one of caution, beyond which a higher speed of the vehicle would be either dangerous or prohibitive. Therefore the driver when he sees the green light will be put on his guard and should know that he must be careful not to drive much faster, or as a variation the green light may be an indication of a rate of speed too high for some jurisdictions but a perfectly safe speed for in the country or other jurisdictions. It is not my purpose, therefore, to dictate any particular rates of speed or variation in speed which these several colored lights may indicate, it being rather my purpose to set forth a mechanical construction which is sufficiently flexible in practice to be adapted for any desired application. Again, the contact 40 as will be appreciated is made effective when the speed becomes high enough to throw the disk beyond the green field and hence the driver, as well as the public, is or should be notified by the appearance of the red light that the machine is operating under a rate of speed that is too high.

While the circuit 32 includes only the lamp 29 at the tell-tale each of the circuits 33 and 34 includes not only a tell-tale lamp but also one or more correspondingly colored lamps in the indicator casing, these being indicated in the drawings as 30′ and 31′ respectively. I wish to point out at this time that while I show the lamps 30′ and 31′ arranged in circular series the number thereof may be greater or less than as shown and the design of the casing may be such that the movable parts thereof may be of any other desired shape or arrangement than as shown herein. It follows therefore that while the lamp 30 shows green to the driver the lamps 30′ will show green to the public, and while the lamp 31 is glowing, the lamps 31′ will be glowing to the exclusion of all the green lamps. The lamp 14, however, is constant within the limits of speed above described so that the public will always be able to determine the approximate rate of speed registered by the vehicle when the green or the red indicator lights are glowing.

At 41 I indicate a master switch which when open would break all the circuits.

The indicator casing 10 is provided with two concentric annular chambers or spaces 42 and 43 to house respectively the sets of green and red lamps 30′ and 31′. The sockets 44 of these lamps may all be secured in the wall separating these two annular spaces but having their open ends alternately on opposite sides of said wall.

I claim:

1. In an indicator of the class set forth, the combination of a casing, a member projected into the casing and movable according to variations in speed of the vehicle, a member movably attached to the speed member aforesaid, means to cause the latter mentioned member to move with and under such movements of the speed member as are determined by large changes of speed, means to control the movement of the latter mentioned member to hold it steady during smaller changes of speed of the speed member, and means carried by the second mentioned movable member to indicate such variations in speed of the vehicle as produce changes of position of said second movable member.

2. In a speed indicator for vehicles, the combination of a casing, a speed member projecting into the casing and whose movement is determined by the rate of speed of the vehicle, a second movable member mounted upon the speed member aforesaid, resilient means to connect the latter mentioned member to the speed member, the latter mentioned member bearing numerical indicia to indicate successively step by step variations in speed, and means co-operating with the indicia bearing member to hold it steady during ordinary vibrations of the speed member but permitting it to move step by step during greater changes of speed, whereby the approximate speed of the vehicle will always be determined at one of said indicia held stationary.

3. In a speed indicator for vehicles, the combination of a casing, a speed member journaled therein and adapted for angular movement with respect to the casing according to variations in speed, a disk mounted upon the speed member, said disk bearing on one side a circular series of numerical indicia concentric with the speed member whereby when the disk is rotated as a result of rotation of a speed member the indicia will be brought successively to a certain position, a display chamber formed in the casing along one end of which the indicia are caused to move, and means to illuminate the indicia in said display chamber so to be visible from a distance.

4. A device as set forth in claim 3 in which means is provided to act upon the disk to control its movements so that the indicia are held at least momentarily steady in the axis of the display chamber.

5. In an indicator for vehicles, the combination of a casing having formed therein a plurality of concentric chambers and a display chamber at one side of the center thereof, a speed member journaled in the axis of the casing, an indicia bearing member connected to the speed member and caused thereby to rotate around the axis of the casing bringing the indicia in succession into view through the display chamber, means to cause different colors of light in the aforesaid chambers, and means carried by the indicia bearing member to make effective the various colors of light in succession in accordance with the rate of speed developed by the speed member.

6. In a speed indicator for vehicles, the combination of a main casing, movable means in the casing the position of which is determined according to the speed of the vehicle, there being provided in the casing independent light spaces each space being adapted to produce light of a different color from the others, a plurality of electric circuits pertaining to the several spaces and colors of light, a tell-tale, means in the tell-tale and in circuit with certain of the aforesaid circuits to cause the same color of light to register at the tell-tale that is displayed at the main casing, and means carried by the movable means within the casing to energize the aforesaid circuits in succession.

7. The herein described indicator for vehicles comprising a circular casing, an annular wall within the casing forming two annular spaces, an annular series of lamp sockets carried by the wall, and a plurality of lamps carried in said sockets.

8. A device as set forth in claim 7 in which there are provided two annular series of lamp sockets projecting through said wall and having their alternate ends on opposite sides thereof, and two series of lamps for the respective series of sockets.

9. In a speed indicator for vehicles, the combination of a casing, a speed member journaled in the casing, the angular displacement or position thereof being determined by the rate of speed of the vehicles, a disk flexibly secured upon the speed member and movable angularly therewith during greater variations in speed, the periphery of the disk being sinuous, and a spring shoe having rounded contact with said periphery and adapted to hold the disk from movement during the minor movements of the speed member.

In testimony whereof I affix my signature.

OSCAR S. HASLETT.